United States Patent [19]

Periou et al.

[11] Patent Number: 4,952,854
[45] Date of Patent: Aug. 28, 1990

[54] CONTROL DEVICE FOR A DC MOTOR INTENDED FOR IN PARTICULAR DRIVING OPENING ELEMENTS ON AUTOMOBILE VEHICLES

[75] Inventors: Pierre Periou, Cergy Pontoise; Jean Dauvergne, Fosses, both of France

[73] Assignee: Rockwell-CIM, France

[21] Appl. No.: 296,115

[22] Filed: Jan. 12, 1989

[30] Foreign Application Priority Data

Jan. 19, 1988 [FR] France ................................ 88 00572

[51] Int. Cl.$^5$ ............................................. H02P 1/00
[52] U.S. Cl. ..................................... 318/257; 318/778
[58] Field of Search ............... 318/254, 257, 439, 433, 318/138, 706, 778, 709, 712, 254 A, 696, 280, 286, 287, 782, 434, 452, 66, 779; 388/909, 903, 927, 809, 810, 824

[56] References Cited

U.S. PATENT DOCUMENTS

| | | | |
|---|---|---|---|
| 3,733,532 | 5/1973 | Hill | 318/286 |
| 4,641,074 | 2/1987 | Hamilton, Jr. et al. | 318/709 X |
| 4,642,537 | 2/1987 | Young | 318/439 X |
| 4,780,773 | 10/1988 | Hama | 318/254 |

*Primary Examiner*—William M. Shoop, Jr.
*Assistant Examiner*—A. Jonathan Wysocki

[57] ABSTRACT

A motor control devise including an auxiliary resistor in series with the motor, a relay, including a coil for activation thereof for shorting the resistor, voltage terminals for determining the current in the auxiliary resistor and the voltage in the supply line, a microprocessor programmed to calculate the sum of the resistance of the supply line and the internal motor resistance, a time delay in energizing the relay for shorting the resistor immediately after the calculation of the resistances, and wherein the microprocessor is programmed to calculate instantaneous values of speed and torque of the motor.

15 Claims, 7 Drawing Sheets

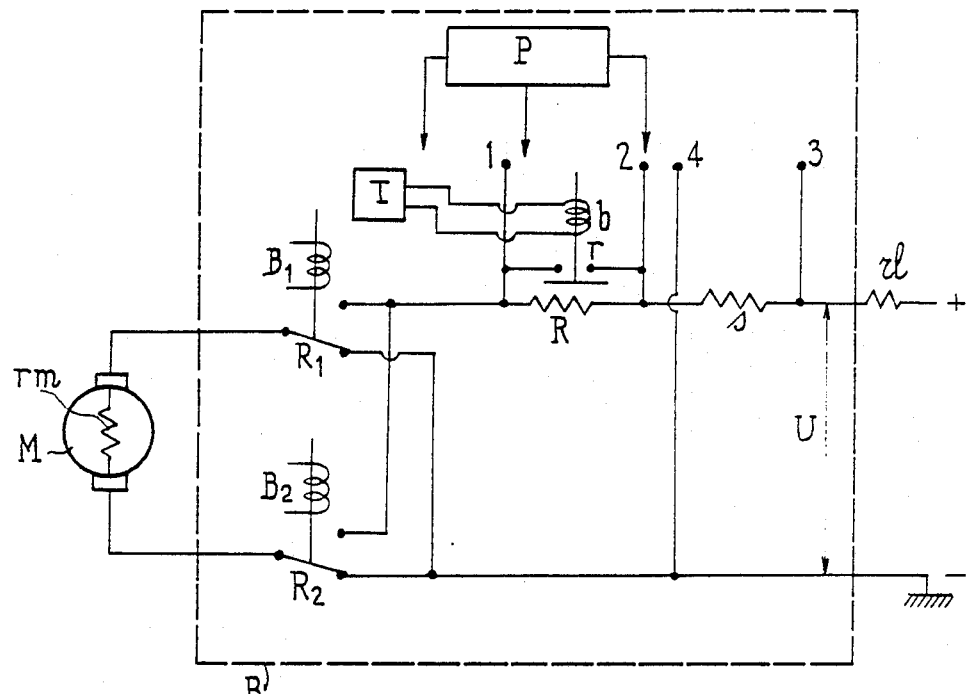
FIG_4
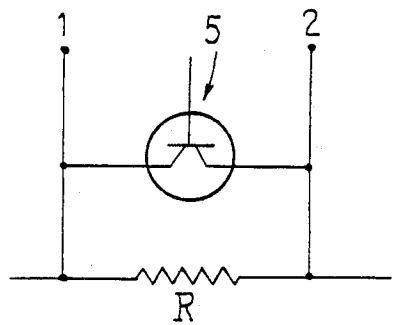
FIG_5

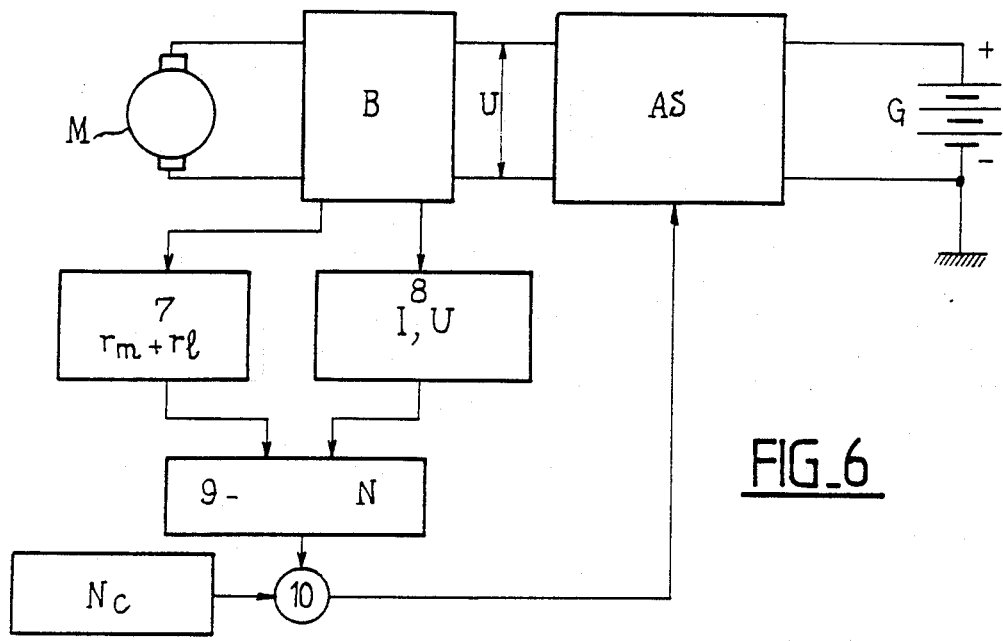
FIG_6
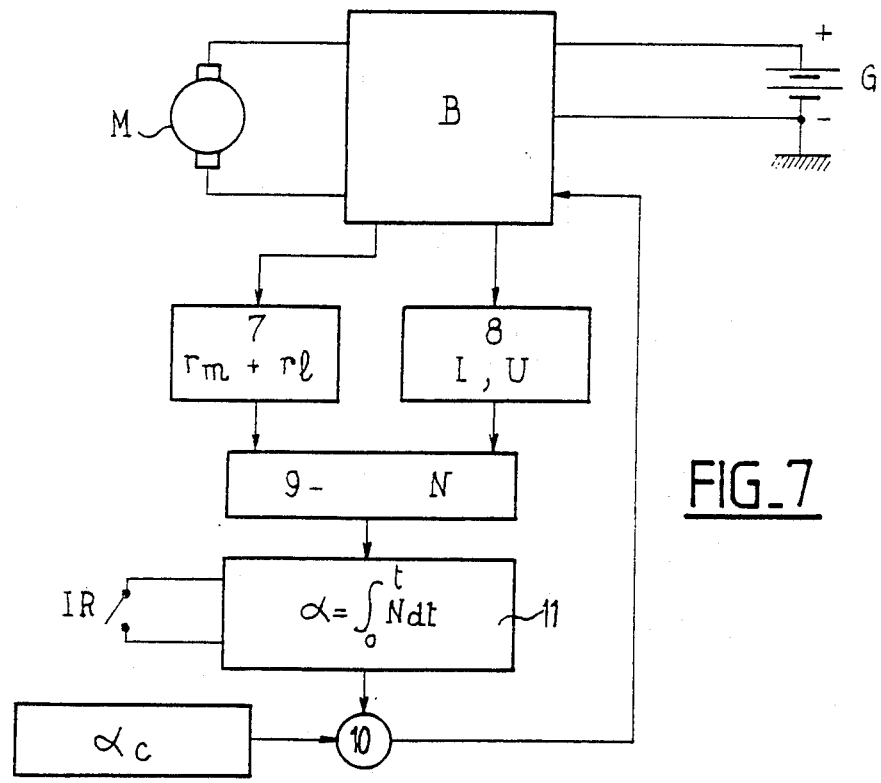
FIG_7

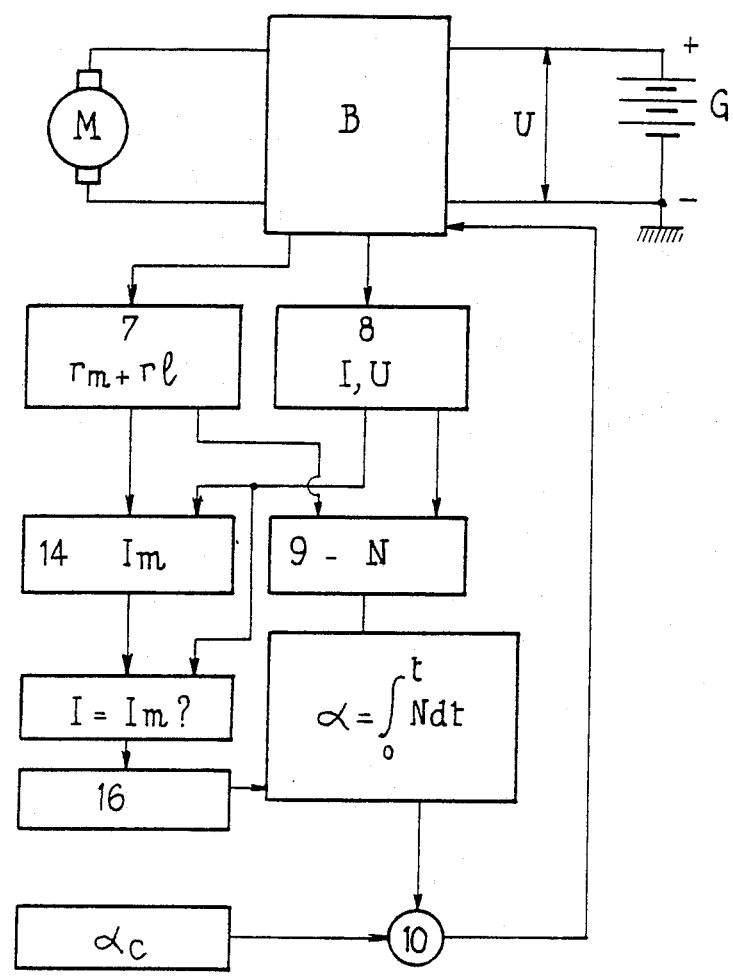
FIG_8

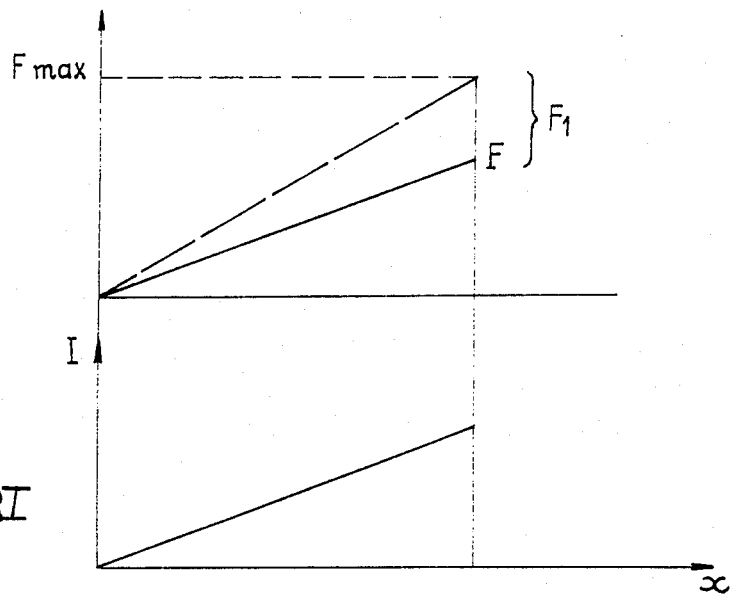
FIG_9
PRIOR ART
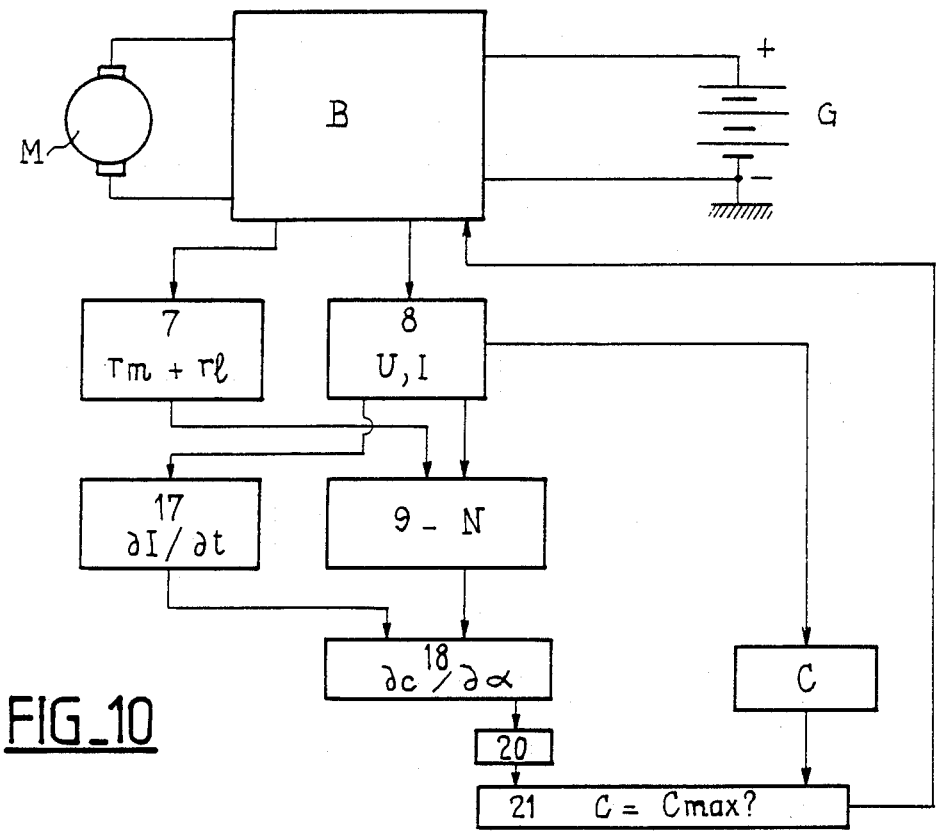
FIG_10

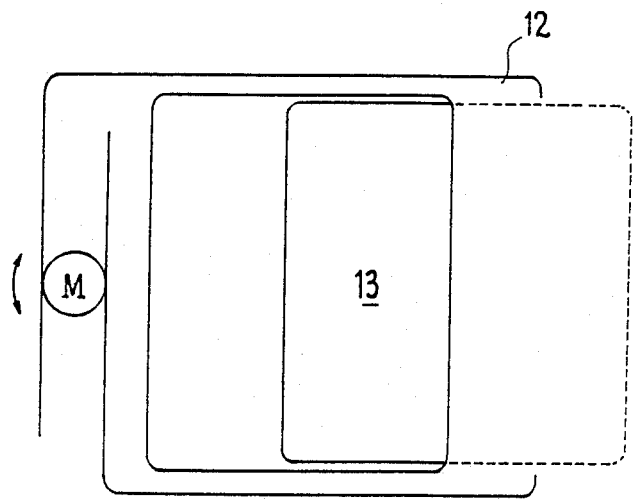
FIG_11
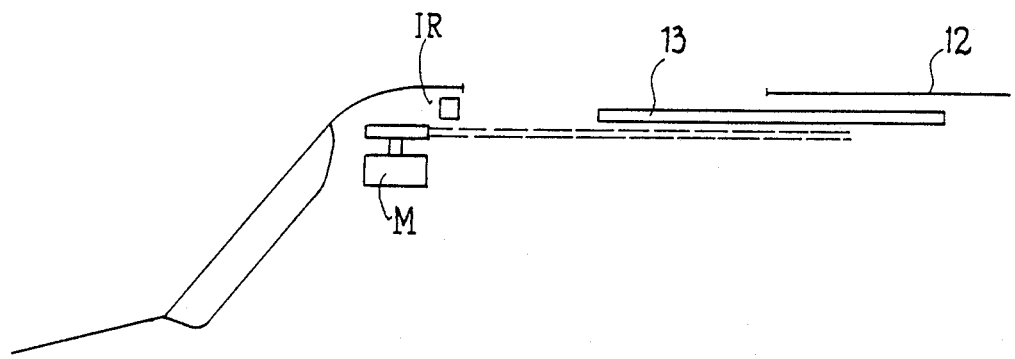
FIG_12

CONTROL DEVICE FOR A DC MOTOR INTENDED FOR IN PARTICULAR DRIVING OPENING ELEMENTS ON AUTOMOBILE VEHICLES

BACKGROUND OF THE INVENTION

1. Field of the Invention

The present invention relates to a control device for a dc motor supplied with power by a voltage generator through a line having a given resistance, in which is inserted at least one relay controlling the motor in one of its directions of operation.

More precisely, this device has for purpose to control one of the mechanical magnitudes delivered by the motor, namely the torque or the speed, or the angular position of the output shaft, or a magnitude derived from these magnitudes. In some cases, the magnitudes delivered by the motor are of intermediate magnitudes, the effective purpose being to control a mechanism driven by the motor.

2. Description of the Related Art

Such control devices are known for certain equipments of vehicles, such as the sliding elements (window raiser or sliding roof) in respect of which it has already been proposed to improve their safety by control means whereby it is possible to interrupt the closing movement when the opening element encounters a foreign body, such as a finger, member or neck of an occupant (individual or animal). A known means consists in an electronic supervision of the magnitude of the current of the motor: when the current magnitude reaches a threshold exceeding the normal operating value, the motor is stopped and reversed so as to release the foreign body.

It has been proposed to improve this method by supervising not only the magnitude of the current, but also its variation with respect to time so as to anticipate the interruption of the operation before reaching a critical threshold.

It has been found that these devices do not correctly guarantee that a foreign body such as a finger, member or neck, is not injured. Indeed, if on the other hand it is desired to avoid accidental interruptions, the current threshold or current variation thresholds with respect to time must be placed rather high so as to avoid intefering with the normal variations due to current anomalies met with in sliding opening elements, such as: stiff points in the joints, anomalies due to frost, etc.

Furthermore, the electric conditions vary considerably with the voltage of the generator and the temperature (which affects the resistance of the circuit), and the thresholds to be determined become incompatible with an operation with no accidental interruption.

In view of these difficulties, it has proposed to add to the motor a sensor which enables the electronic supervising device to measure at any moment the speed of the motor and thereby avoid the problems due to the variations in the electrical conditions. In a known structure comprising such a sensor, the spectrum of the speed in normal operation of the opening element, is recorded in such manner as to constitute a reference with which the real operation is then compared. If the performance in the real operation excessively deviates from this reference, this signifies that a foreign body is in the path of the closing element so that the operation is interrupted and the motor reversed. Such a device has the drawback of being more complex owing to the fact that the sensor must be associated with the motor, and above all of failing to take into account normal variations which may be met with, above all after long periods of inactivity.

An object of the invention is therefore to solve the problem by taking into account variations in the electrical conditions and in particular those of the resistance of the circuit.

SUMMARY OF THE INVENTION

The control device to which the invention relates comprises a dc voltage generator supplying power to a dc motor through a line having a given resistance in which is inserted at least one relay controlling the motor in one of its two directions of operation.

According to the invention, the control device comprises an auxiliary resistor in series with the motor, means for shorting said resistor whose value is chosen to be sufficient to ensure that the motor does not start up when the relay is closed, means for measuring the magnitude of the current which then passes through the auxiliary resistor, and the voltage in the supply line of the motor, means for calculating the sum of the resistance of the line and the internal resistance of the motor from values measured for the magnitude of the current and the voltage, a time delay capable of exciting the means for shorting the auxiliary resistor immediately after the calculation of said sum of the resistances, means for automatically and continuously determining the instantaneous value, either of the speed or of the speed and torque of the motor; from a continuous measurement of the magnitude of the current after the shorting of the auxiliary resistor and the measuring of the voltage, which is preferably effected permanently.

Thus, before each starting up of the motor, it is possible to effect with this device a measurement of the resistance of the circuit whose value is taken as a basis for the calculation for the electronic supervision of the motor.

According to one embodiment of the invention, the speed of the motor is determined and controlled at a set value by modulation of the voltage by means of a stabilized supply associated with a microprocessor.

According to other embodiments of the invention:

the device comprises means for automatically determining the speed of rotation of the motor, then the integration of this speed with respect to time for continuously measuring the angular position of an output shaft of the motor and a mechanism driven by the latter, and for comparing this angular position with a set value;

the device comprises means for initializing, before each utilization of said device, the set value of the angular position by detection of the maximum current upon the abutment of a mechanism driven by the output shaft of the motor;

the device comprises means for automatically determining, in a continuous manner, the speed of rotation of the motor, the torque of the motor from the angular position of the output shaft of the motor and the mechanism driven by the latter, the ratio of the variation of the torque as a function of said angular position, means for comparing said ratio and an allowable limit torque stored in the memory of the microprocessor, for comparing the torque of the motor with this limit torque and for stopping the motor if the torque of the latter is equal to the limit torque.

The control device according to the invention therefore permits taking into account normal variations in the considered parameters of the electric circuit, and thus avoiding ordering untimely stoppages of the motor which are not justified by real reasons of safety.

Other features and advantages of the invention will be apparent from the following description which is given with reference to the accompanying drawings which illustrate several embodiments of the invention given by way of non-limitative examples:

BRIEF DESCRIPTION OF THE DRAWINGS

FIG. 4 is an electric diagram similar to FIG. 3 showing a second embodiment of the control device according to the invention;

FIG. 5 is a detail view illustrating a variant of the control device shown in FIGS. 3 and 4;

FIG. 6 is an algorithm or flow chart illustrating a first embodiment of the device according to the invention in which only the speed of rotation of the motor is determined by the software program of the processor and compared with a set value;

FIG. 7 is an algorithm illustrating a second embodiment of the control device according to the invention in which the speed of rotation of the motor is indicated with respect to time by the microprocessor for determining the angular position of its output shaft and comparing it with a set value;

FIG. 8 is an algorithm illustrating an improvement in that shown in FIG. 7, in which the maximum allowable current in the motor is measured for locating the angular position of its output shaft;

FIG. 9 is a diagram representing the variation in the force exerted by a sliding opening element driven by the motor on an obstacle as a function of the variation of the displacement of the point of impact of the opening element on this obstacle;

FIG. 10 is an algorith illustrating a fourth embodiment of the control device according to the invention, in which the microprocessor permanently calculates the variation in the torque of the motor as a function of the angular position of its output shaft and the torque of the motor is measured and compared with an allowable safety limit torque;

FIGS. 11 and 12 are diagrammatic views respectively in plan and in side elevation of a sliding roof of an automobile vehicle, whose driving motor may be equipped with a control device according to the invention.

DESCRIPTION OF THE PREFERRED EMBODIMENT

Figure 1:
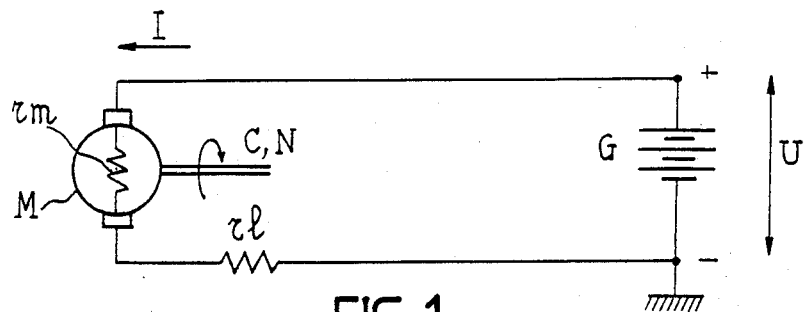
FIG. 1 is a diagram representing the electric circuit of a dc motor capable of being equipped with a control device according to the invention.

FIG. 1 shows the electric circuit of a dc motor M whose $r_m$ is the internal resistance, r1 is the line resistance, U is the voltage of the dc current generator, I the value of the current, the output shaft of the motor M developping a torque C and rotating at a speed N.

Figure 2B:
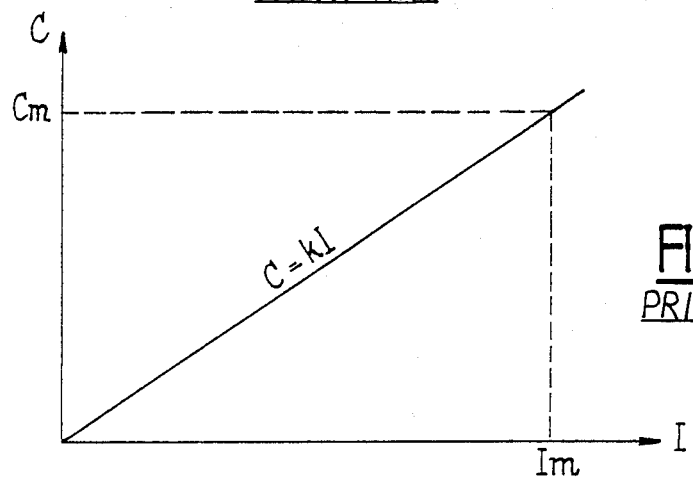
FIG. 2B is a diagram showing the variation in the torque of the motor as a function of the current.
Figure 2C:
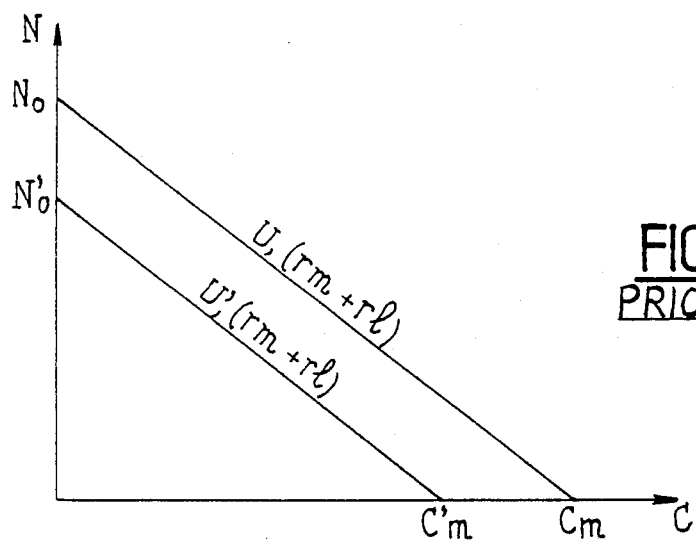
FIG. 2C is a diagram showing the variation in the speed of rotation of the motor as a function of the torque for two different values of the voltage of the generator.
Figure 2A:
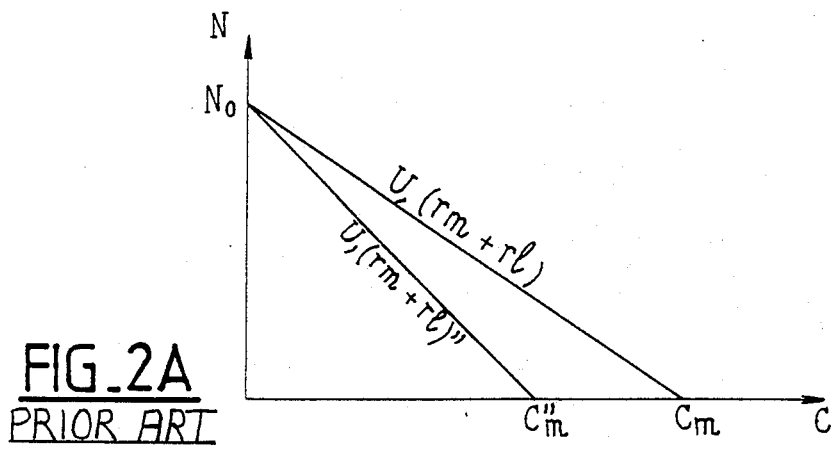
FIG. 2A a diagram illustrating the relationship between the speed and the torque of the motor for a given voltage of the generator, but with two different values of the resistance of the circuit.

FIG. 2A shows two curves of linear variation of the speed N as a function of the torque C, for the same voltage U but for two different values of the resistance of the circuit: $(r_m+r1)$ and $(r_m+r1)''$, and FIG. 2C the variation of N as a function of C for two voltages U, U', the resistance of the circuit remaining constant.

It is known that the relation between the torque of a dc motor and the current passing therethrough is a linear relation of the type:

$$C=kI \text{ (FIG. 2B)}$$

in which k is a constant of the construction of the motor; In this relation, the maximum $I_m$ corresponds to the case where the motor reaches its maximum torque $C_m$ corresponding to the blocked state, in which it has zero speed of rotation. In this case, the motor behaves as a passive resistance whose value is that of its winding. The current $I_m$ is then determined by Ohm's law:

$$U=(r_m+r1)I_m$$

in which U is the voltage of the generator, $r_m$ is the resistance of the motor, r1 is the resistance of the supply line, $r_m+r1$ is the resistnace of the circuit (FIG. 1).

Furthermore, the torque C is related to the speed N of the motor by the relation:

$$N = N_o\left(1 - \frac{C}{C_m}\right) \quad \text{(FIG. 2A)}$$

in which $N_o$ is the unloaded speed. It is therefore possible to relate the speed N to the current I by the relation:

$$N = N_o\left(1 - \frac{I}{I_m}\right)$$

It is of interest to note that $N_o$ is proportional to the voltage U of the generator, so that (FIG. 2C):

$$N_o=k'U$$

and $$N = k'U\left(1 - \frac{I}{I_m}\right)$$

in which k' is another constant of the construction of the motor.

Therefore, if in addition to the measurement of the resistance of the circuit $(r_m+r1)$, the instantaneous voltage U and the instantaneous current I are measured, it is possible to know at any moment:

the torque C from the relation:

$$C=kI$$

the speed N from $N=k'U[1-I(r_m=r1)/U]$ the position of the output shaft from:

$$\alpha = \int_o^t N dt$$

the variation of the torque relative to time:

$$\frac{\partial C}{\partial t} = k \frac{\partial I}{\partial t}$$

or relative to the angle $\alpha$ $$\frac{\partial C}{\partial \alpha} = k \frac{\partial I}{\partial t} \cdot \frac{\partial t}{\partial \alpha}$$

with $\delta t/\delta \alpha$ proportional to $1/N$.

Figure 3:
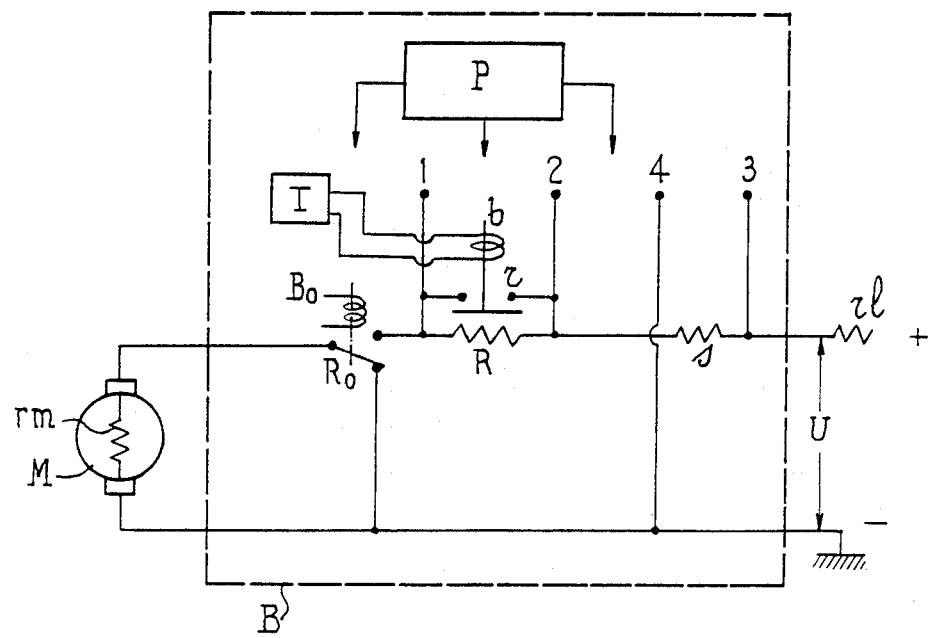
FIG. 3 is a diagram of the electric circuit of the motor equipped with a control device according to a first embodiment.

FIG. 3 shows the electric circuit of FIG. 1 equipped with a control device of the motor M in a first embodiment thereof. This device is contained in a control box B which comprises: a relay $R_o$ with a coil $B_o$, an auxiliary resistor R in series with the motor M, means for shorting the resistor R constituted in this embodiment by a relay r having a coil b connected in parallel to the resistor R and connected to terminals 1 and 2.

The circuit further comprises a shunt s placed between the resistor R and the + terminal of the generator, and measuring points 3, 4 respectively between the shunt s and the + terminal and between the − terminal and the motor M. The auxiliary resistor R is chosen in such manner that its value is sufficient to ensure that the motor M does not start up when the relay $R_o$ is closed and a time delay T is associated with the coil b of the relay r.

The control box B further comprises a microprocessor P having stored in the memory the parameters of the motor M, i.e. the characteristics permitting the determination of the torque C as a function of the value I of the current, therefore the maximu torque $C_m$ as a function of the maximum current $I_m$, the speed N as a function of the torque C for a given voltage U and for different values of the line resistance, and the speed N as a function of the torque C for different voltages U having a constant line resistance.

The control device shown in FIG. 3 is employed in the following manner:

When it is desired to start up the motor M, the coil $B_o$ is excited, for example by an exterior switch (not shown) available to the user or by any automatic element corresponding to the utilization of the motor M. The excitation of the coil B has for effect to close the contact $R_o$.

This closure allows the current to flow from the generator through the line of resistance r1, the shunt s, the auxiliary resistor R and the motor M. As the resistor R is large enough to ensure that the motor M does not start up, it is possible to measure the value i of the current in R, by measuring the voltage between the points 1 and 2:

$$U_{1,2} = Ri, \text{ whence } i = U_{1,2}/R$$

A simultaneous measurement of voltage U between the points 3 and 4 therefore permits determining:

$$r_m + rl = \frac{U}{i} - R .$$

(the resistance of the shunt s being then included in the line resistance r1).

When this measurement has been made, i.e. some tens of a millisecond after the excitation of the coil $B_o$, the time delay T excites the coil b of the shorting relay r, which has for effect to short the auxiliary resistor R by the relay r. Thenceforth, the motor M is in condition for operation at the voltage R through the circuit resistance $(r_m+r1)$ according to FIGS. 2B and 2C.

The measurement of the current effected by measuring the voltage at the terminals of the shunt s then permits knowing the torque C (FIG. 2B), by calculating means stored in the memory of the microprocessor P provided with a suitable software program. The latter controls the operation of the motor in accordance with a given law, for example the stoppage and its reversal when a limit value $C_{max}$ of the torque, which will be defined hereinafter, is reached.

The circuit shown in FIG. 4 illustrates the operation of the motor M in both directions of rotation For this purpose, the terminals of the motor are connected to two relays $R_1$ and $R_2$, controlled by the coils $B_1$ and $B_2$ which reverse the polarity, the circuit being moreover identical to that shown in FIG. 3.

In the embodiment shown in FIG. 5, the shorting element is a transistor 5 connected in parallel with the resistor R.

The operation of the circuit shown in FIGS. 4 and 5 is the same as that shown in FIG. 3.

The block diagram shown in FIG. 6 represents an embodiment of the invention in which the control device contained in the elelctronic box B is completed by a stabilized supply AS connected in parallel with the box B and connected to the generator G of the voltage U, this embodiment enabling the speed of rotation N of the motor M to be controlled.

The speed N may be controlled by modulation of the voltage U. Indeed, there exists the following relation:

$$U = \frac{N}{k'} + I(r_m + rl)$$

The control box B may therefore be constructed to give an order for the regulation at the stabilized supply AS controlling the voltage U, in the known manner;

For this purpose, the box B and its microprocessor P effect the following operations: at 7, the measurement of the resistance of the line $r_m+r1$ at 8, the measurement of I and U, then at 9 the calculation of the speed N by means of the relation $N=k'[(U-I(r_m+r1)]$, comparison at 10 of the instantaneous speed N with the set speed $N_x$ and regulation of the voltage U as a function of the result of this comparison.

In the block diagram shown in FIG. 7, illustrating another embodiment of the invention, the control device of the motor M does not have a stabilized supply and is programmed to permit the location of the angular position of the output shaft of the motor.

This angular position of the motor, or, which amounts to the same thing, the position of the mechanism associated therewith, may be compared with a set value $a_c$.

The value of $\alpha$ is obtained by integration of speed N:

$$\alpha = \int_0^t N\,dt$$

N being calculated, as before, by the microprocessor in the step 9 and then compared at 10 with $\alpha_c$, with transmission of the result of the comparison to the box B.

It is advantageous to re-position periodically the value of the integration constant $\alpha_o$ so as to avoid the cumulative deviations of the errors. For this purpose, the addition of a switch IR (FIG. 7) in the kinematic chain, as concerns the integration at 11 of the value of $\alpha$ with respect to time, permits the initialization of this integration calculation.

According to another embodiment of the invention, the initialization may be achieved by detection of the maximum current $I_m$ when the mechanism controlled by the motor M reaches its end-of-travel abutment. This is the case of a vehicle window raiser in respect of which the maximum current $I_m$ in the direction for raising the glass corresponds to the complete closure, whereas the maximum $I_m$ in the glass lowering direction corresponds to the complete opening of the glass.

In this application of the control device of the invention, the algorithm of the program is that shown in FIG. 8.

It can be seen in the latter that, after measurement at 7 and 8 of the line resistance $(_m + r1)$ and the voltage U, the microprocessor calculates $I_m$ (step 14), then compares the instantaneous value of the current I with $I_m$ and proceeds to the initialization (step 16). At the same time, the microprocessor calculates the speed N from I and U, then integrates it with respect to time t for determining the angular position, which is then compared at 10 with the set value $\alpha_C$. The results are used in such manner as to detect the upper or lower end-of-travel position of the window glass and then give the order to stop the motor M.

FIGS. 9 and 10 illustrate another embodiment of the invention, in which the device is applied to the checking of the variation of the torque for the safety of a sliding opening element.

It is known that the presence of an obstacle in the path of a sliding opening element results in an increase in the effort which is proportional to the displacement of the point of impact on the obstacle in accordance with the relation:

$$\Delta F = K \Delta x$$

in which K is the "rigidity" of the obstacle. This force $\Delta F$ corresponds to an increase in the current of the motor $\Delta I$, which is however not directly related to $\Delta F$ owing to the effects of inertia. Inded, the greater the rigidity of the obstacle, the greater the inertia of the parts in motion introduce an increased effort due to kinetic energy.

In practice, if it is desired to limit the force on the foreign body, the motor must be stopped for an increase in current which is all the smaller as the rigidity of this obstacle is greater.

The diagram shown in FIG. 9 illustrates the variation of the force F exerted on the foreign body as a function of the displacement x of the point of impact on the latter. It can be seen that the effect of inertia results in an increase $F_1$ of the force F, which is added to the effective force F of the mechanism. Thus, it will be understood that it is necessary to intervene by stopping the motor as a function of the speed at which the current varies, and the magnitude of this current, so as to guarantee that the maximum force $F_{max}$ does not reach a dangerous value.

The algorithm of FIG. 10 shows how the programming of the microprocessor P may be achieved for the checking of the safety of a sliding opening element, such as a window glass of a vehicle. As in the preceding embodiments, the box B measures first of all at 7 and 8 the resistance $r_m + r_1$, the voltage U and the magnitude I of the current, then the program calculates the speed of rotation N (step 9). Then (step 17), the microprocessor calculates $\delta I/\delta t$ and the variation $\delta C/\delta \alpha$ of the torque C as a function of the angular position $\alpha$ (step 18) by use of the previously-indicated relations.

$\delta C/\delta \alpha$ is then continuously compared at 20 with limit torque values $C_{max}$ of acceptable safety, functions of the various possible foreign bodies, this table of correspondence between the values $\delta C/\delta \alpha$ and $C_{max}$ being stored in the memory of the microprocessor.

Simultaneous with the above calculations, the microprocessor permanently determines the torque C from the measurement of the current I and (step 21) compares the latter with the limit torque $C_{max}$. If the measured torque C is equal to the limit torque $C_{max}$, the program automatically stops the motor M and, as the case may be, reverses its direction of rotation if the maximum angular position corresponding to the arrival at the end-of-travel stop is not reached at this moment. This device is particularly applicable to a sliding roof or a window raiser of a vehicle.

The diagram shown in FIGS. 11 and 12 show a vehicle 12 equipped with a sliding roof 13 controlled by the motor M through slideway cables in the known manner. The switch IR, corresponding to the embodiment shown in FIG. 7, permits locating the position of complete closure of the opening element 13. The set value $\alpha_c$ is then determined and corresponds to the complete opening. A second set value $\alpha_c$, which is variable, may be produced by means available to the user and the system then acts as a selector of the opening position.

We claim:

1. A control device comprising, in combination with a dc motor having two directions of operation, a voltage generator and a line having a given resistance which connects the generator to the motor, at least one control relay inserted in the line for the motor in one of the directions of operation of the motor, said device further comprising an auxiliary resistor in series with the motor whose value is chosen to be sufficient to ensure that the motor does not start up when the control relay is closed, means for shorting the auxiliary resistor, means for measuring the magnitude of the current which then passes through the auxiliary resistor and the voltage in the supply line of the motor, means for calculating the sum of the resistance of the line and the internal resistance of the motor from values measured for the magnitude of the current and the voltage, a time delay associated with the shorting means and capable of exciting the shorting means following on the calculation of said sum of resistances, and means comprising a microprocessor for automatically and continuously determining an instantaneous value selected from the speed and the speed and torque of the motor from a continuous measurement of the magnitude of the current after shorting the auxiliary resistor and measuring the voltage.

2. A device according to claim 1, wherein the voltage is measured permanently.

3. A device according to claim 1, wherein the speed of the motor is determined and compared with a set value.

4. A device according to claim 3, comprising a stabilized supply associated with the microprocessor, the speed of the motor being controlled at the set value by modulation of the voltage by means of the stabilized supply.

5. A device according to claim 1, comprising an output shaft of said motor, a mechanism drivenly connected to the output shaft, means for automatically determining the speed of rotation of the motor, then the integration of said speed with respect to time for continuously measuring the angular position of the output shaft of the motor and of said mechanism, and for comparing said angular position with a set value stored in the memory of the microprocessor.

6. A device according to claim 5, comprising end-of-travel stop means for said mechanism, means for initializing the integraiton constant of the angular position by detection of the maximum current upon abutment of said mechanism against said end-of-travel stop means.

7. A device according to claim 1, wherein the motor has an output shaft, and the device further comprises a mechanism drivenly connected to said output shaft, means for automatically and continuously determining the speed of rotation of the motor, the torque of the motor, the angular position of said output shaft and the mechanism, the ratio of the variation of the torque as a function of said angular position, means for comparing said ratio with an allowable limit torque stored in the memory of the microprocessor, and for comparing the torque of the motor with said limit torque and for stopping the motor if the torque of the motor is equal to the limit torque.

8. A device according to claim 1, wherein the means for shorting the auxiliary resistor is a relay connected in parallel to terminals of said resistor.

9. A device according to claim 1, wherein the means for shorting the auxiliary resistor is a transistor connected in parallel to terminals of said resistor.

10. A device according to claim 6, comprising a switch for re-initializing periodically the integration constant of said angular position.

11. A device according to claim 3, comprising a stabilized supply associated with the microprocessor, the speed of the motor being controlled at the set value by modulation of the voltage by means of the stabilized supply, and a vehicle window raising mechanism drivenly connected to said motor.

12. A device according to claim 4, comprising an output shaft of said motor, a mechanism drivenly connected to the output shaft, means for automatically determining the speed of rotation of the motor, then the integration of said speed with respect to time for continuously measuring the angular position of the output shaft of the motor and of said mechanism, and for comparing said angular position with a set value stored in the memory of the microprocessor, said mechanism being a vehicle sliding roof drivenly connected to said output shaft, said device locating the completely closed position of the sliding roof.

13. A device according to claim 4, comprising an output shaft of said motor, a mechanism drivenly connected to the output shaft, means for automatically determining the speed of rotation of the motor, then the integration of said speed with respect to time for continuously measuring the angular position of the output shaft of the motor and of said mechanism, and for comparing said angular position with a set value stored in the memory of the microprocessor, said mechanism being a sliding opening element connected to said output shaft, said device detecting the complete closure or the complete opening of the window glass corresponding to abutment against an upper stop and a lower stop determining the respective initialization positions.

14. A device according to claim 7, wherein said mechanism is a sliding opening element of a vehicle, drivenly connected to said output shaft.

15. A device according to claim 14, said device being a selector of the opening position of the opening element in response to a variable set value which may be generated by means available to the user.

* * * * *